United States Patent
Staal et al.

(10) Patent No.: US 12,441,429 B1
(45) Date of Patent: Oct. 14, 2025

(54) REAR WHEEL LOCKING MECHANISM FOR PERSONAL TRANSPORT DEVICE

(71) Applicant: Honda Motor Co., Ltd., Tokyo (JP)

(72) Inventors: Matthew B. Staal, Torrance, CA (US); Jackie P. Porchay, Torrance, CA (US); Michael Jin Kim, Long Beach, CA (US); Ming Hsein Lee, Taichung (TW); Ding Jong Chou, Taichung (TW); Sheng Yu Huang, Taichung (TW)

(73) Assignee: HONDA MOTOR CO., LTD., Tokyo (JP)

( * ) Notice: Subject to any disclaimer, the term of this patent is extended or adjusted under 35 U.S.C. 154(b) by 797 days.

(21) Appl. No.: 17/708,726

(22) Filed: Mar. 30, 2022

(51) Int. Cl.
*B62K 15/00* (2006.01)

(52) U.S. Cl.
CPC .................... *B62K 15/00* (2013.01)

(58) Field of Classification Search
CPC ...................................... B62K 15/00
See application file for complete search history.

(56) References Cited

U.S. PATENT DOCUMENTS

| | | | |
|---|---|---|---|
| 6,364,334 B1 * | 4/2002 | Kuba | B62K 15/00 280/287 |
| 6,712,375 B2 | 3/2004 | Chao | |
| 6,971,658 B2 | 12/2005 | Chao | |
| 8,814,195 B2 | 8/2014 | Beistegui Chirapozu et al. | |
| 9,033,350 B2 * | 5/2015 | Porri | A45C 5/146 280/37 |
| 9,493,206 B1 | 11/2016 | Oh | |
| 9,629,430 B1 * | 4/2017 | Getahun | A45C 5/03 |
| 11,932,302 B1 * | 3/2024 | Porchay | B62K 21/12 |
| 12,005,988 B1 * | 6/2024 | Staal | B62K 11/14 |
| 2004/0094919 A1 * | 5/2004 | Roder | A45C 5/14 280/30 |
| 2005/0043147 A1 | 2/2005 | Huang | |
| 2025/0074536 A1 * | 3/2025 | Ziraldo | B62K 15/006 |

FOREIGN PATENT DOCUMENTS

| | | | |
|---|---|---|---|
| CN | 2897796 Y | * | 5/2007 |
| CN | 201161666 Y | | 12/2008 |
| CN | 201161671 Y | | 12/2008 |
| CN | 102649456 B | | 8/2012 |

(Continued)

*Primary Examiner* — Valentin Neacsu
*Assistant Examiner* — Hosam Shabara
(74) *Attorney, Agent, or Firm* — Plumsea Law Group, LLC (57) ABSTRACT

A personal transport device convertible between a riding configuration and a stowed configuration is described. In one embodiment, a rear wheel locking mechanism for the personal transport device includes a bracket having a recess on an underside of the bracket. The recess is configured to mate with a protruding knuckle on a rear wheel arm of the personal transport device. A securing tab is attached to a back end of the bracket at a pivot mechanism. The securing tab includes a top end and a bottom end opposite the top end. The pivot mechanism causing the top end and the bottom end of the release tab to move in opposite directions. The bottom end of the securing tab is configured to engage with a knob on a rear wheel arm of the personal transport device to secure the rear wheel arm in place to prevent linear movement.

19 Claims, 12 Drawing Sheets

(56) References Cited

FOREIGN PATENT DOCUMENTS

| | | |
|---|---|---|
| CN | 103770877 A | 5/2014 |
| CN | 204077940 U | 1/2015 |
| CN | 204250254 U | 4/2015 |
| CN | 103183096 A | 8/2016 |
| CN | 107458525 A | 12/2017 |
| CN | 207311725 U | 5/2018 |
| WO | 2011071193 A1 | 6/2011 |
| WO | 2012152069 A1 | 11/2012 |

* cited by examiner

REAR WHEEL LOCKING MECHANISM FOR PERSONAL TRANSPORT DEVICE

BACKGROUND

This disclosure relates generally to vehicles, and in particular to a rear wheel locking mechanism for a compact personal transport device that is convertible between a stowed configuration and a riding configuration.

With rising prices of gasoline and automobiles, many people may turn to other more cost efficient modes of transportation such as, for example, mopeds, bicycles, scooters and, more recently, compact personal transport devices, such as electric scooters. These personal transport devices may be particularly popular for shorter trips in a city environment due to their compact size, ease of use, mobility, and the fact that they may be folded as needed for ease of portability. They may also be useful for covering the first mile or last mile of a trip which is the link between a user's origin or destination and another transportation means, hub or mass transit network. One existing barrier to widespread use of compact personal transport devices is the time needed to set up and collapse the devices before and after their use.

Accordingly, there is a need in the art for an improved compact personal transport device that can be set up and collapsed quickly.

SUMMARY

In one aspect, a rear wheel locking mechanism for a personal transport device is provided. The rear wheel locking mechanism includes a bracket having a recess on an underside of the bracket. The recess is configured to mate with a protruding knuckle on a rear wheel arm of the personal transport device. A securing tab is attached to a back end of the bracket at a pivot mechanism. The securing tab includes a top end and a bottom end opposite the top end. The pivot mechanism causing the top end and the bottom end of the release tab to move in opposite directions. The bottom end of the securing tab is configured to engage with a knob on a rear wheel arm of the personal transport device to secure the rear wheel arm in place to prevent linear movement.

In another aspect, a rear wheel locking mechanism for a personal transport device is provided. The rear wheel locking mechanism includes a sliding mechanism configured to move a rear wheel of the personal transport device between an extended position and a stowed position. An arm is connected to the rear wheel of the personal transport device at one end and connected to the sliding mechanism at an opposite end. A protruding knuckle is mounted on a top portion of the arm. A bracket is connected to a rear end of a track of the sliding mechanism, the bracket including a recess on an underside of the bracket. The recess is configured to mate with the protruding knuckle on the top portion of the arm to secure the rear wheel of the personal transport device in the extended position.

In another aspect, a personal transport device is provided. The personal transport device including an outer casing, a front wheel, and a rear wheel. The personal transport device also including a sliding mechanism inside the outer casing. The sliding mechanism is configured to move the rear wheel between an extended position and a stowed position. In the extended position, the rear wheel is located inward of a rear edge of the outer casing and in the stowed position, the rear wheel extends beyond the rear edge of the outer casing. The personal transport device also includes an arm connected to the rear wheel of the personal transport device at one end and connected to the sliding mechanism at an opposite end. The personal transport device further includes a rear wheel locking mechanism configured to secure the rear wheel in the extended position. The rear wheel locking mechanism includes a bracket having a recess on an underside of the bracket and a protruding knuckle mounted on a top portion of the arm. The recess is configured to mate with the protruding knuckle to secure the rear wheel in the extended position.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Embodiments of a compact personal transport device with a rear wheel locking mechanism that secures the rear wheel in place when the personal transport device is in the riding configuration are described herein. The techniques described in connection with the present embodiments may be used to provide a personal transport device having a convenient rear wheel locking mechanism that allows a user to secure the rear wheel in the riding configuration and also includes a release handle that allows the user to unlock the rear wheel to quickly collapse the personal transport device to the stowed configuration. In the stowed configuration, the personal transport device has a compact form factor that allows a user to carry it in a primary vehicle, on public transportation, and/or on other forms of transportation to be used for "last-mile" or "first-mile" trips to and from a destination.

The example embodiments are described herein with reference to a personal transport device in the form of an electric scooter. As used herein, an electric scooter is a term used mainly to describe a scooter that is electrically powered. For example, this is a type of personal transport device that is gaining ridership in many locations. The principles of the example embodiments described herein may be applied to electric scooters or other types of personal transport devices, such as bicycles, unicycles, mopeds, skateboards, kickboards, wheelchairs, personal transporters, or the like.

In the example embodiments described herein, the electric scooter has an outer casing having a generally rectangular shape, including two flat sides having a length that is longer than a height. In addition, the electric scooter of the present embodiments has a width that is substantially smaller than the length and/or height of the electric scooter. In the example embodiments, the electric scooter may be transitioned between a riding configuration in which components of the electric scooter are in extended positions outside of the rectangular outer casing so that the electric scooter may be operated or ridden by a user to a stowed configuration in which components of the electric scooter are folded or stowed inside the outer casing.

Figure 1:
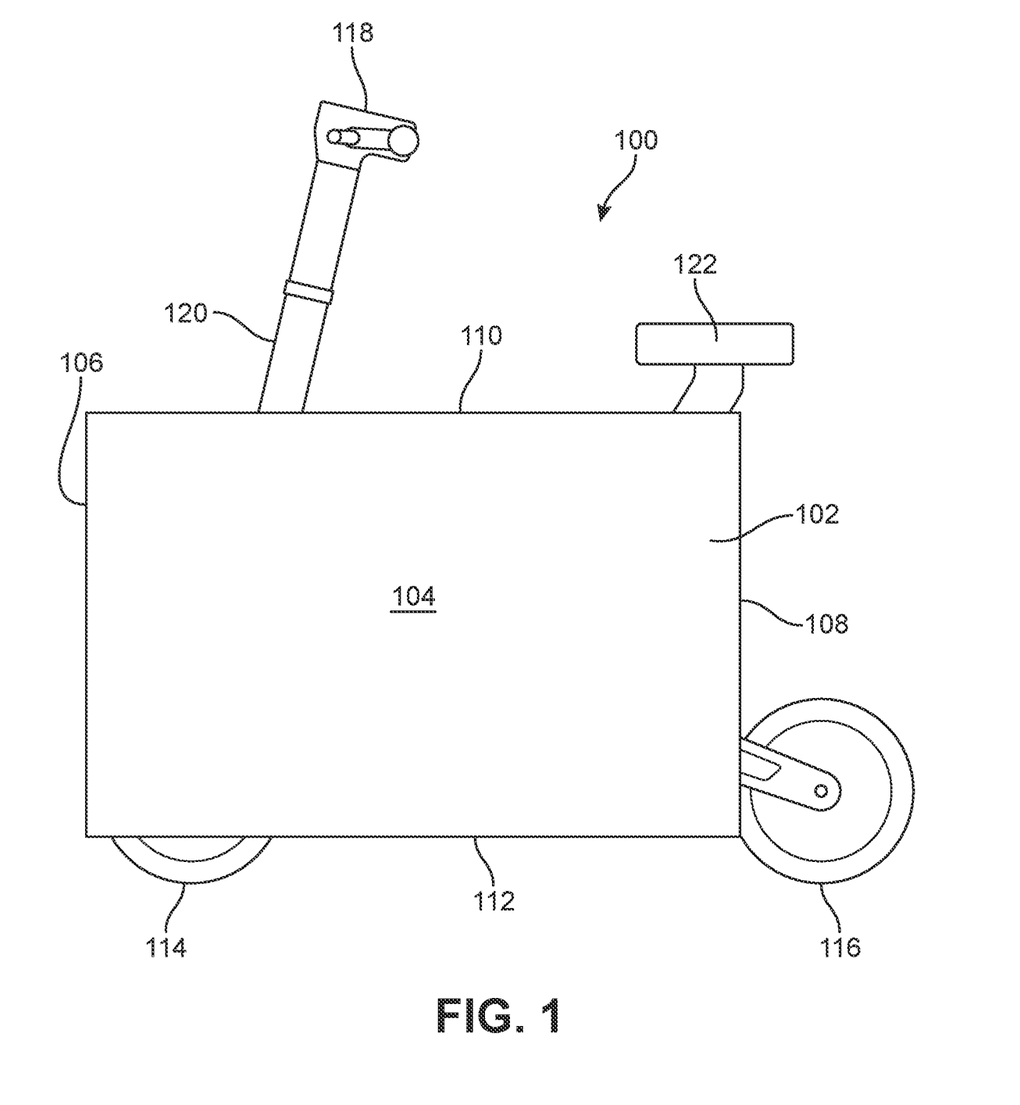
FIG. 1 is a side view of an example embodiment of a compact personal transport device in the form of an electric scooter in a riding configuration in accordance with aspects of the present disclosure.

Referring now to FIG. 1, an example embodiment of a compact personal transport device 100 (e.g., in the form of an electric scooter 100) is shown. In some embodiments, electric scooter 100 may be quickly transitioned or converted between a riding configuration in which components of electric scooter 100 are in extended positions outside of an outer casing 102 so that electric scooter 100 may be operated or ridden by a user to a stowed configuration in which components of electric scooter 100 are folded or collapsed to stowed positions inside outer casing 102. As shown in FIG. 1, electric scooter 100 is in the riding configuration.

In this embodiment, outer casing 102 of electric scooter 100 includes a first side surface 104 (shown in FIG. 1) and an opposite second side surface (not shown). Outer casing 102 has a width (W) between first side surface 104 and the opposite second side surface that defines a thickness of electric scooter 100. In an example embodiment, side surfaces of outer casing 102 are substantially flat, including each of first side surface 104 and the opposite second side surface. Outer casing 102 of electric scooter 100 extends between a front edge 106 and an opposite rear edge 108, as well as a top edge 110 and an opposite bottom edge 112. Front edge 106, rear edge 108, top edge 110, and bottom edge 112 are substantially straight and define an outer perimeter of rectangular-shaped outer casing 102 of electric scooter 100.

In this embodiment, a front wheel 114 is visible along bottom edge 112 of electric scooter 100 near front edge 106. Electric scooter 100 also includes a rear wheel 116 that is shown extended outside of outer casing 102 (i.e., in the riding configuration as shown in FIG. 1) along bottom edge 112 near rear edge 108. Rear wheel 116 is configured to slide or retract inside of outer casing 102 in the stowed configuration.

Electric scooter 100 includes a top surface disposed between first side surface 104 and the opposite second side surface. In some example embodiments, the top surface includes an opening extending substantially along the length of electric scooter 100 (i.e., from front edge 106 to rear edge 108). In one embodiment, the opening may be in the form of a slot disposed between first side surface 104 and the opposite second side surface.

In some embodiments, electric scooter 100 includes components configured to allow a user to ride electric scooter 100 in the riding configuration. For example, in this embodiment, electric scooter 100 includes a steering assembly 118 and a seat 120. Steering assembly 118 is configured to control orientation of front wheel 114 to allow a user to steer electric scooter 100 in the riding configuration. In an example embodiment, steering assembly 118 includes a steering shaft 120 connected to front wheel 114 and handlebars that are configured to receive hands of a user to steer front wheel 114. In some embodiments, steering assembly 118 may include additional components that allow a user to control electric scooter 100, such as, for example, throttle and brake controls, which may be located on the handlebars. In some embodiments, seat 120 is configured to mount to a seat post that is attached internally to the inside of electric scooter 100 (e.g., inside outer casing 102) via a pivot mechanism or other attachment mechanism that allows seat 120 to be folded inside outer casing of electric scooter 100 in the stowed configuration.

It should be understood that a personal transport device according to the embodiments described herein may include additional components not shown or described. For example, a personal transport device in the form of an electric scooter (e.g., electric scooter 100) may include components such as a battery, throttle and brake controls, lights, etc. that allow a user to ride the electric scooter. Other embodiments of personal transport devices may also include additional or different components without departing from the techniques of the present embodiments described herein.

Figure 2:
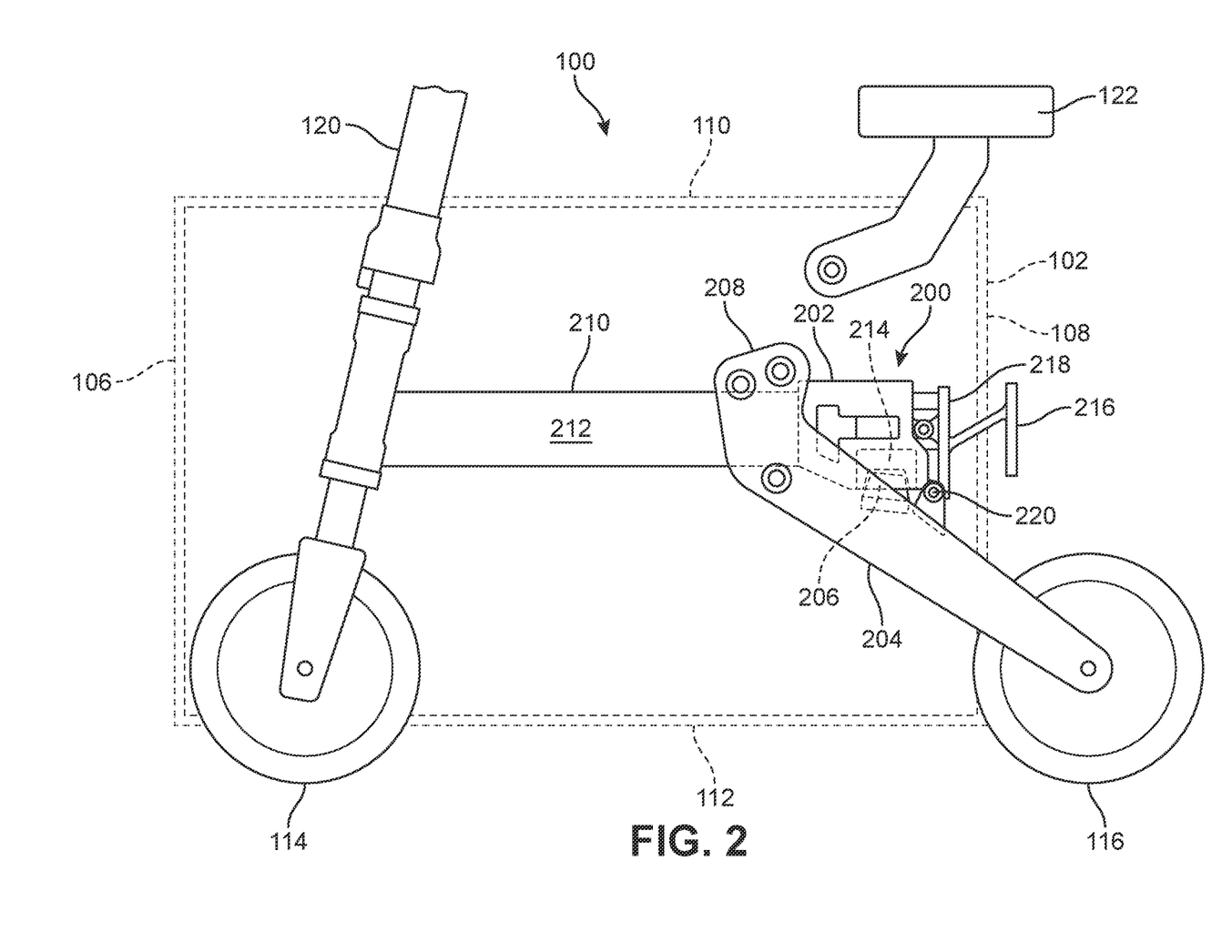
FIG. 2 is a side view showing internal components of the compact personal transport device of FIG. 1 in accordance with aspects of the present disclosure.

Referring now to FIG. 2, a side view showing the internal components of personal transport device in the form of electric scooter 100 is shown. In this view, outer casing 102 of electric scooter 100 is shown in cross-section so that the internal components are visible. In an example embodiment, electric scooter 100 includes a rear wheel locking mechanism 200 (also referred to herein as "locking mechanism 200"). In some embodiments, locking mechanism 200 includes a bracket 202 that includes components configured to allow locking mechanism 200 to secure rear wheel 116 in an extended position outside of outer casing 102 of electric scooter 100 when electric scooter 100 is in the riding configuration.

In an example embodiment, rear wheel 116 of electric scooter 100 is configured to move between an extended position outside of outer casing 102 of electric scooter 100 (e.g., in the riding configuration) and a stowed or collapsed position inside of outer casing 102 (e.g., in the stowed configuration). In some embodiments, a sliding mechanism 210 is configured to allow rear wheel 116 to move between the extended position and the stowed position. In an example embodiment, an arm 204 is attached to an axle of rear wheel 116 at one end and is attached to a carrier 208 at an opposite end. Carrier 208 is attached in a slidable manner to a track 212 of sliding mechanism 210. For example, carrier 208 may include a bearing assembly or similar apparatus to allow carrier 208 to slide back and forth (i.e., forwards towards front edge 106 or rearwards towards rear edge 108) along track 212 of sliding mechanism 210 in a substantially horizontal direction so that rear wheel 116 can move between the extended position and the stowed position.

In this embodiment, arm 204 extends at an upwards angle from rear wheel 116 to track 212 of sliding mechanism 210. With this arrangement, arm 204 is configured to control linear movement of rear wheel 116 between the extended position outside of outer casing 102 of electric scooter 100 and the stowed position inside of outer casing 102. That is, arm 204 slides along track 212 of sliding mechanism 210 via carrier 208 to retract rear wheel 116 inwards (i.e., in a forward direction towards front edge 106) and/or to extend rear wheel 116 outwards (i.e., in a rearward direction towards rear edge 108). In some embodiments, bracket 202 of locking mechanism 200 is located at a rear end of track 212 of sliding mechanism 210.

In an example embodiment, locking mechanism 200 includes a protruding knuckle 206 that is mounted or attached along a top portion of arm 204. Protruding knuckle 206 is configured to mate or associate with a corresponding void or recess 214 along an underside of bracket 202. In an example embodiment, protruding knuckle 206 has an approximately trapezoidal or prism shape and recess 214 has a corresponding shape to receive protruding knuckle 206. In one embodiment, protruding knuckle 206 and recess 214 may have corresponding rectangular shapes, including, for example, rounded rectangular shapes with smooth edges to assist with sliding and/or mating protruding knuckle 206 and recess 214 together when locking mechanism 200 is in a secured position (e.g., securing rear wheel 116 in the extended position).

In some embodiments, locking mechanism 200 may also include a lifting member 216. As shown in FIG. 2, lifting member 216 extends outside of outer casing 102 of electric scooter 100 past rear edge 108 at the back of electric scooter 100. In an example embodiment, lifting member 216 is attached to a securing tab 218 that engages a ball or knob 220 on the top portion of arm 204. When securing tab 218 is engaged with knob 220 on arm 204, rear wheel 116 is locked in the extended position and protruding knuckle 206 is also prevented from being removed from within recess 214. With this arrangement, locking mechanism 200 secures rear wheel 116 in the extended position outside of outer casing 102 when electric scooter 100 is in the riding configuration so that electric scooter 100 may be ridden without rear wheel 116 sliding forward or collapsing.

In an example embodiment, lifting member 216 is configured to allow a user of electric scooter 100 to grab lifting member 216 and pull upwards to release locking mechanism 200 from the secured position to an open position to thereby allow rear wheel 116 to slide inwards from the extended position to the stowed position. For example, when a user pulls upwards on lifting member 216, securing tab 218 releases knob 220 on arm 204 and protruding knuckle 206 may be removed from within recess 214. Once released, rear wheel 116 may then be collapsed or stowed to place electric scooter 100 in the stowed configuration, as will be described in more detail below.

Figure 3:
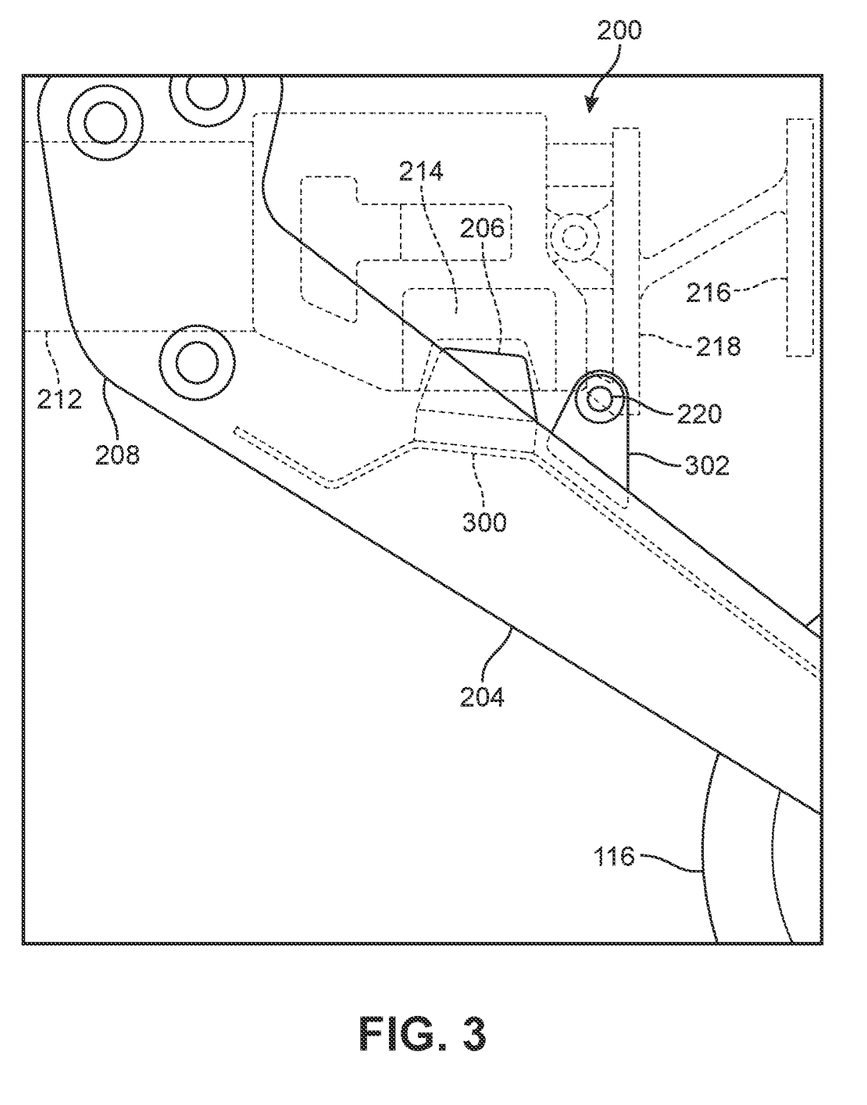
FIG. 3 is an enlarged view of a rear wheel arm of the compact personal transport device in accordance with aspects of the present disclosure.

Referring now to FIG. 3, an enlarged view of arm 204 attached to rear wheel 116 is shown with bracket 202 above in outline. In an example embodiment, protruding knuckle 206 on arm 204 may be mounted or attached to the top portion of arm 204 by an arm support 300. Arm support 300 may be located along the top portion of arm 204 and provides a base or platform on which protruding knuckle 206 may be mounted. In this embodiment, arm support 300 also provides a base or platform to mount or attach a triangular-shaped bracket 302 with knob 220 located at the top. As shown in FIG. 3, triangular-shaped bracket 302 is mounted or attached to arm support 300 behind (e.g., more rearward towards rear edge 108) protruding knuckle 206 so that knob 220 is closer to rear wheel 116 than protruding knuckle 206. The placement of knob 220 and protruding knuckle 206 on arm 204 via arm support 300 is configured to align these components with the corresponding components on the underside of bracket 202 that allow locking mechanism 200 to lock and secure rear wheel 116 in the extended position.

Figure 4:
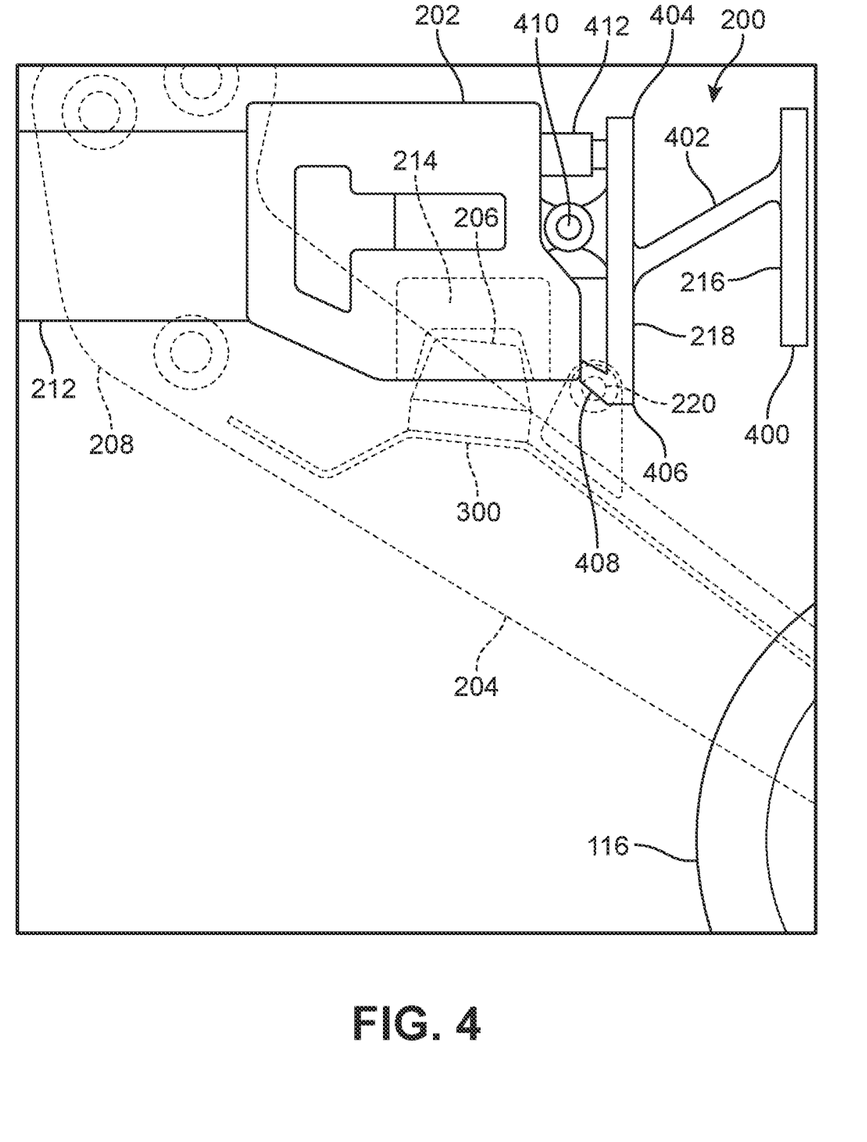
FIG. 4 is an enlarged view of an example embodiment of a rear wheel locking mechanism of the compact personal transport device in accordance with aspects of the present disclosure.

Referring now to FIG. 4, an enlarged view of bracket 202 of locking mechanism 200 is shown with arm 204 below in outline. In an example embodiment, bracket 202 is located at a rear end of track 212 of sliding mechanism 210 (e.g., adjacent to rear edge 108 of outer casing 102, as shown in FIG. 2). As shown in FIG. 4, recess 214 along the underside of bracket 202 is aligned over protruding knuckle 206 on arm 204 so that protruding knuckle 206 is disposed within recess 214 of bracket 202 when locking mechanism 200 is in the secured position to prevent movement of rear wheel 116, for example, when electric scooter 100 is in the riding configuration.

In some embodiments, lifting member 216 extends rearward from bracket 202 and a portion of lifting member 216 is located outside of outer casing 102 so that it may be gripped and pulled by a user of electric scooter 100. In an example embodiment, lifting member 216 includes a release handle 400. Release handle 400 is attached to an extension arm 402 that connects release handle 400 to securing tab 218 at a back end of bracket 202. With this arrangement, extension arm 402 may extend through an opening in rear edge 108 of outer casing 102 of electric scooter 100 (as shown in FIG. 2) so that release handle 400 of lifting member 216 is located outside of outer casing 102 and may be gripped and pulled by a user of electric scooter 100.

In some embodiments, securing tab 218 is configured to engage with knob 220 on arm 204 to secure or lock rear wheel 116 in the extended position outside of outer casing 102 (e.g., when electric scooter 100 is in the riding configuration). In an example embodiment, securing tab 218 has a top end 404 and an opposite bottom end 406. A catch latch 408 is located at bottom end 406 of securing tab 218. Catch latch 408 has an upwardly angled catch or hook mechanism that engages with and secures knob 220 through a mechanical interlocking arrangement when securing tab 218 is in a closed position, as shown here in FIG. 4. With this arrangement, locking mechanism 200 is in a secured position to prevent linear movement of rear wheel 116 forwards or rearwards along track 212 of sliding mechanism 210.

In an example embodiment, securing tab 218 is attached to the back end of bracket 202 via a pivot mechanism 410. Pivot mechanism 410 allows securing tab 218 to pivot to move between the closed position and an open position. In the closed position, shown in FIG. 4, top end 404 of securing tab 218 is vertically aligned above bottom end 406 and catch latch 408 is engaged with knob 220. By moving top end 404 of securing tab 218 forwards (e.g., towards bracket 202), securing tab 218 pivots or rotates at pivot mechanism 410 to move bottom end 406 rearwards (e.g., away from bracket 202). This movement acts to release catch latch 408 at bottom end 406 from its engagement with knob 220 when securing tab 218 is in the open position. With this arrangement, securing tab 218 may be released to allow or permit movement of rear wheel 116, for example, to be stowed or collapsed when electric scooter 100 is transitioned to the stowed configuration, as will be described below.

In an example embodiment, top end 404 of securing tab 218 may be moved forward to transition securing tab 218 from the closed position to the open position by upwards movement of lifting member 216. As shown in this embodiment, release handle 400 of lifting member 216 is connected to securing tab 218 at a point beneath pivot mechanism 410 via extension arm 402. With this arrangement, when a user grips and pulls release handle 400 of lifting member 216 upwards, extension arm 402 transmits this movement to cause securing tab 218 to pivot at pivot mechanism 410, thereby moving top end 404 of securing tab 216 forwards (e.g., towards bracket 202) to release catch latch 408 at bottom end 406 of securing tab 216 from its engagement with knob 220 on arm 204.

In some embodiments, locking mechanism 200 may also include a return cylinder 412 configured to push top end 404 of securing tab 218 back towards the closed position. In an example embodiment, return cylinder 412 is located on the back end of bracket 202 directly adjacent to top end 404 of securing tab 218. For example, when a user stops pulling upwards on release handle 400 of lifting member 216, return cylinder 412 may act to push top end 404 rearwards to return securing tab 218 to the closed position. In some cases, return cylinder 412 may include a spring that acts to push against top end 404 of securing tab 218 to return securing tab 218 to the closed position. In other cases, return cylinder 412 may include a gas piston, hydraulic piston, or other similar mechanism, that exerts an outward force to push top end 404 of securing tab 218 to the closed position.

According to the principles of the example embodiments described herein, locking mechanism 200 is configured to secure rear wheel 116 of a compact personal transport device, for example, electric scooter 100, in the extended position outside of outer casing 102 when the personal transport device is in the riding configuration. Additionally, providing rear wheel locking mechanism 200 with releasable securing tab 218 allows rear wheel 116 to transition between the riding configuration and the stowed configuration. For example, FIGS. 5-7 below illustrate an exemplary process of using rear wheel locking mechanism 200 to transition the personal transport device in the form of electric scooter 100 from the riding configuration to the stowed configuration. FIGS. 8-12 below illustrate an exemplary process of the reverse operation of using rear wheel locking mechanism 200 to transition electric scooter 100 from the stowed configuration to the riding configuration.

Figure 5:
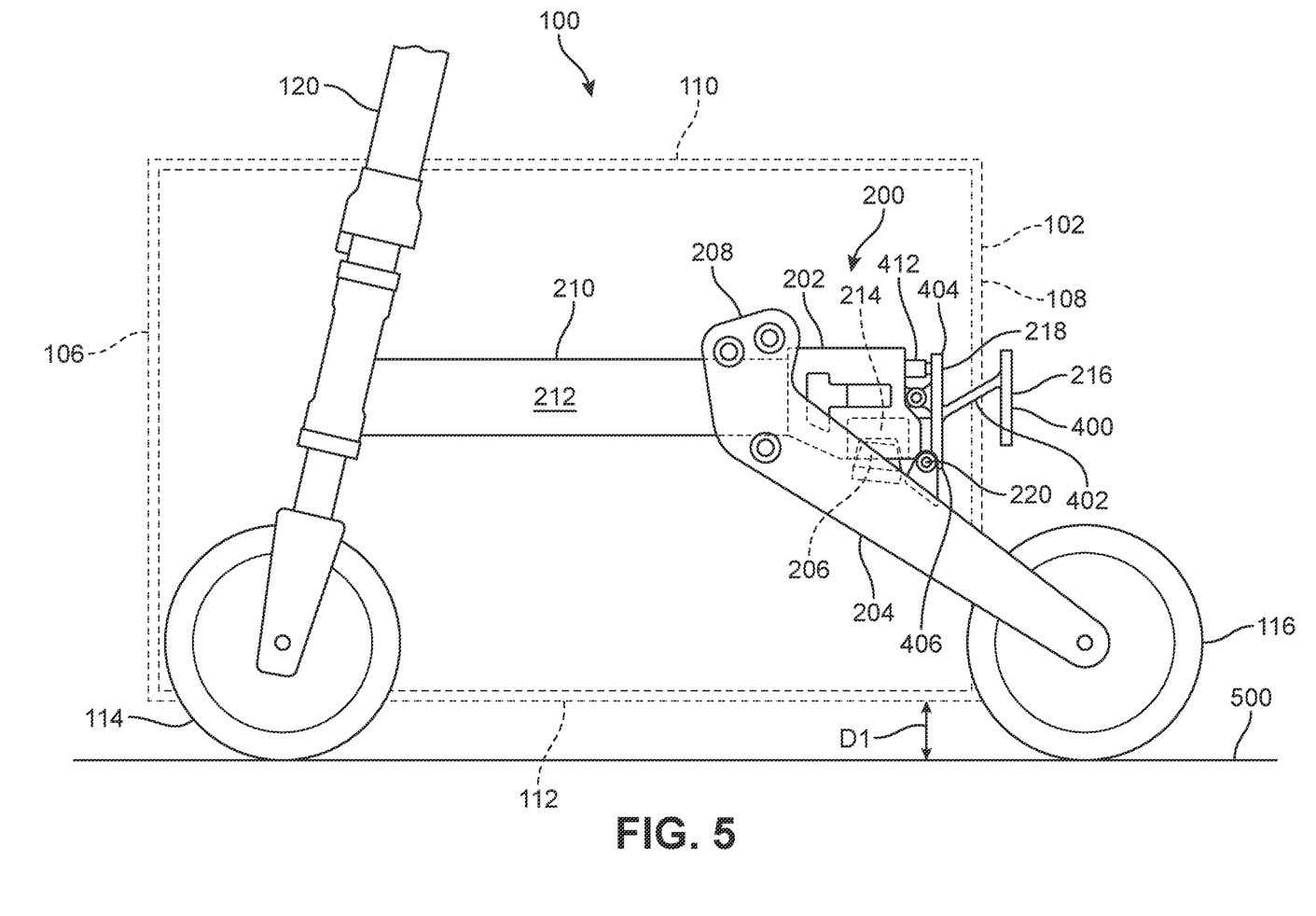
FIG. 5 is a side view of the compact personal transport device in the riding configuration with the rear wheel locking mechanism in a secured position in accordance with aspects of the present disclosure.

For the purposes of illustration, some components of electric scooter 100 are omitted from FIGS. 5-12 so that the operation of rear wheel locking mechanism 200 may be more clearly shown. Referring now to FIG. 5, in this embodiment electric scooter 100 is in the riding configuration with rear wheel 116 in the extended position outside of outer casing 102. In the riding configuration, electric scooter 100 may be ridden by a user. Accordingly, when electric scooter 100 is in the riding configuration, locking mechanism 200 operates to secure rear wheel 116 in the extended position so that it does not accidentally slide inwards along track 212 of sliding mechanism 210 and collapse while electric scooter 100 is being ridden.

In this embodiment, locking mechanism 200 is in the secured position with protruding knuckle 206 on the top portion of arm 204 disposed within recess 214 along the underside of bracket 202 and securing tab 218 in the closed position so that catch latch 408 on bottom end 406 of securing tab 218 is engaged with knob 220 on arm 204 to further prevent movement of rear wheel 116. With this configuration, electric scooter 100 is secured in the riding configuration so that it may be ridden by a user on a surface, for example, a ground surface 500. Ground surface 500 may be pavement associated with a street or road or may be some other surface, such as a sidewalk, trail, bike lane, etc. on which electric scooter 100 may be ridden. As shown in FIG. 5, when electric scooter 100 is in the riding configuration, front wheel 114 and rear wheel 116 are in contact with ground surface 500 such that bottom edge 112 of outer casing 102 is spaced apart from ground surface 500 by a first distance (D1).

Figure 6:
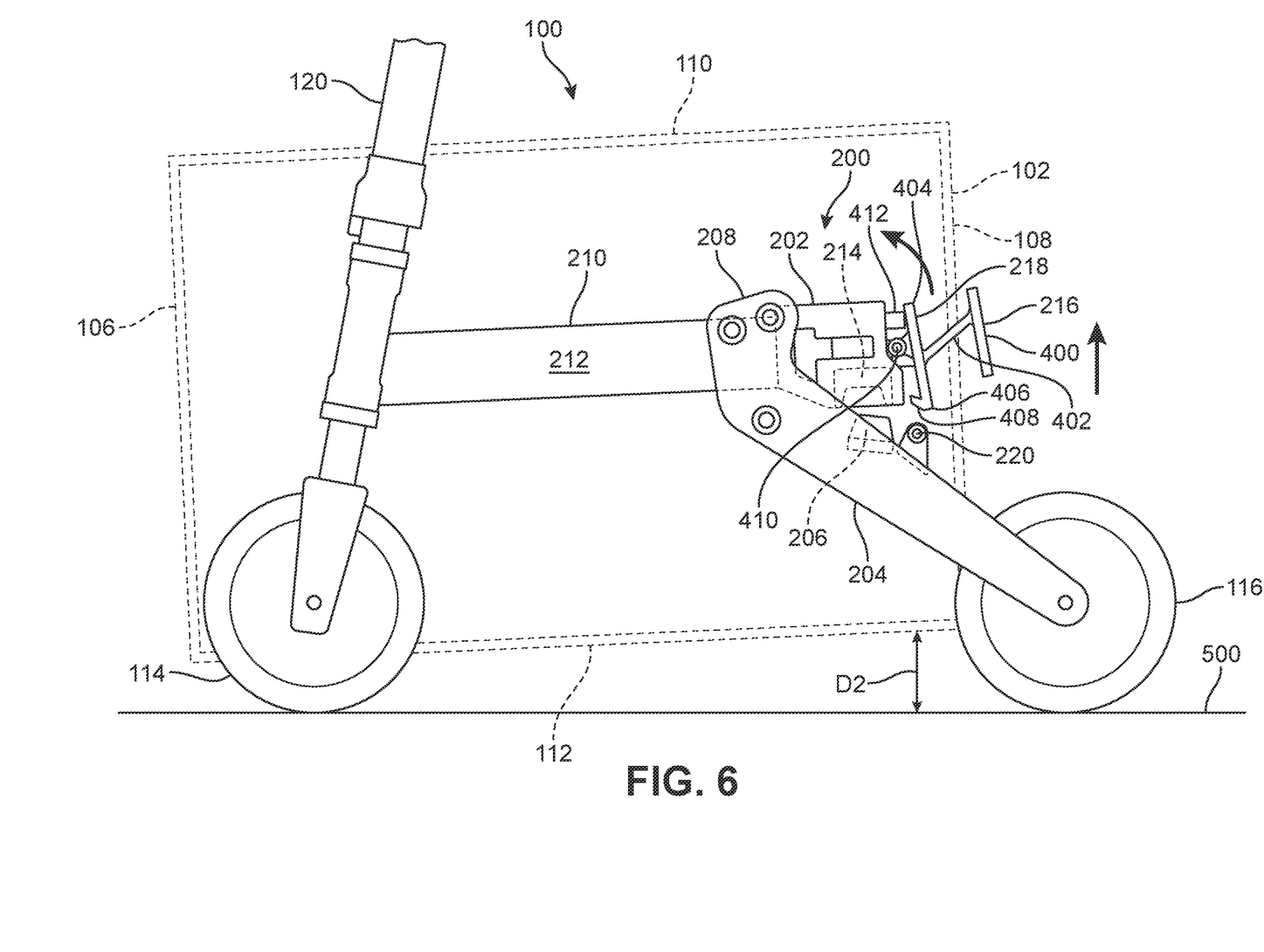
FIG. 6 is a side view of the compact personal transport device being lifted upwards to release the rear wheel locking mechanism in accordance with aspects of the present disclosure.

Referring now to FIG. 6, electric scooter 100 is shown being raised or lifted upwards as part of the process of unlocking locking mechanism 200 to release rear wheel 116. In this embodiment, locking mechanism 200 is unlocked by action of a user gripping release handle 400 of lifting member 216 and pulling in an upwards direction. For example, in this embodiment, a user may use release handle 400 of lifting member 216 to raise outer casing 102 of electric scooter 100 from its initial position (e.g., first distance D1, as shown in FIG. 5) to a raised position with bottom edge 112 of outer casing 102 spaced apart from ground surface 500 by a second distance (D2). In this embodiment, second distance (D2) is greater than first distance (D1) shown in FIG. 5.

Lifting member 216 is connected to securing tab 218 by extension arm 402 so that pulling release handle 400 of lifting member 216 upwards causes securing tab 218 to rotate or pivot at pivot mechanism 410 to move top end 404 of securing tab 218 forwards (e.g., towards bracket 202) and the opposite bottom end 406 rearwards (e.g., in a direction away from bracket 202). The rearward movement of bottom end 406 of securing tab 218 moves catch latch 408 to disengage or release knob 220 of arm 204 from its engagement with catch latch 408.

Once catch latch 408 is released from its engagement with knob 220, rear wheel 116 and arm 204 remain in contact with ground surface 500 as outer casing 102 and locking mechanism 200 are moved upwards by action of the user pulling release handle 400 of lifting member 216 in the upwards direction. This movement allows knob 220 to be free from engagement with catch latch 408 and also allows protruding knuckle 206 on arm 204 to be removed from recess 214 on the underside of bracket 202. With knob 220 disengaged from catch latch 408 and protruding knuckle 206 removed from recess 214, rear wheel 116 is free to move inwards in a linear direction along track 212 of sliding mechanism 210 towards front edge 106 to transition rear wheel 116 from the extended position to a stowed or collapsed position inside outer casing 102 as electric scooter 100 is transitioned from the riding configuration to the stowed configuration.

Figure 7:
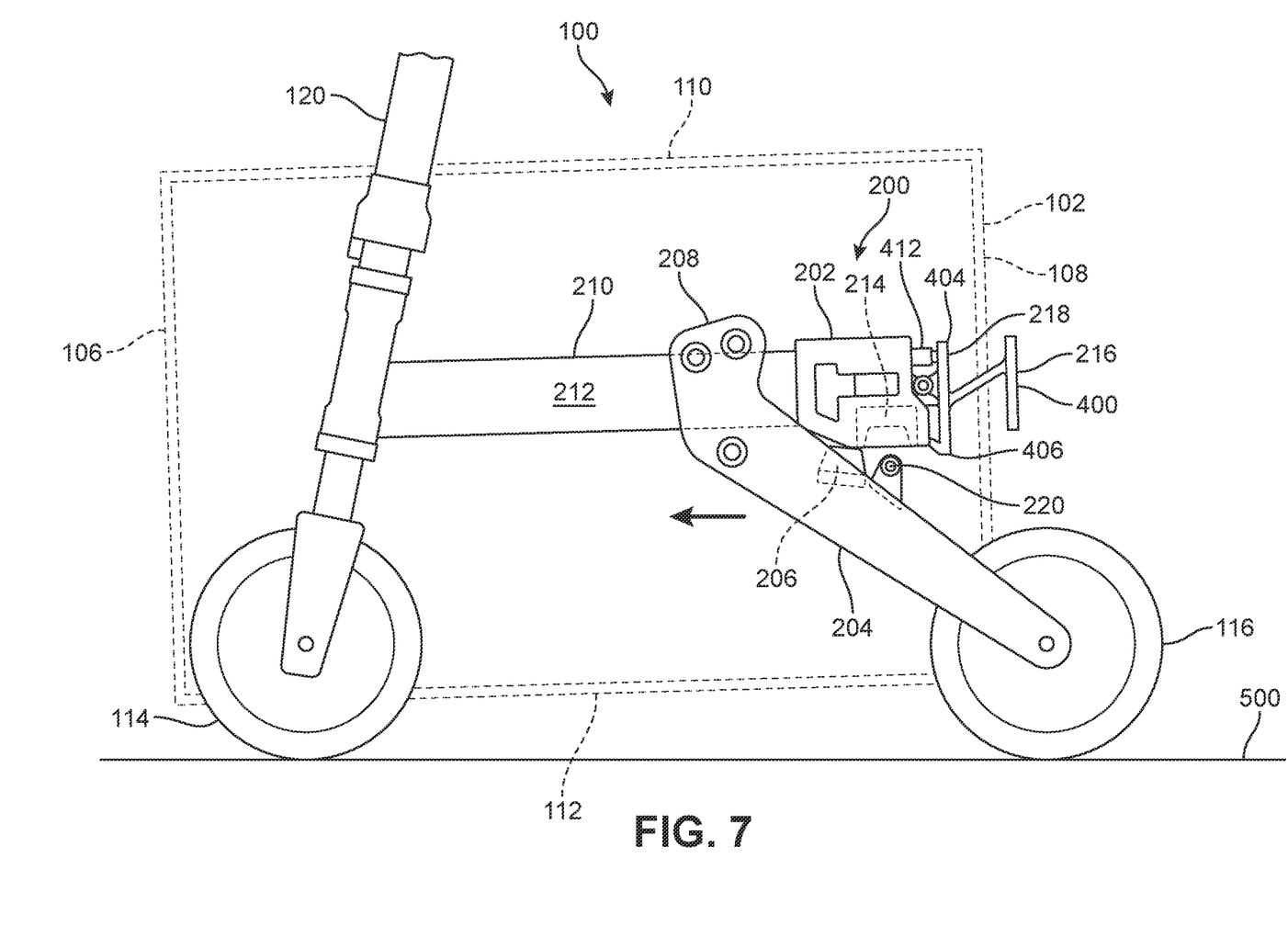
FIG. 7 is a side view of the compact personal transport device being transitioned to the stowed configuration with the rear wheel locking mechanism in an open position in accordance with aspects of the present disclosure.

For example, referring now to FIG. 7, rear wheel 116 is shown moving inwards from the extended position outside of outer casing 102 to collapse or stow rear wheel 116 as part of the process of transitioning electric scooter 100 from the riding configuration to the stowed configuration. In an example embodiment, sliding mechanism 210 is configured to move rear wheel 116 inwards in a linear direction by sliding carrier 208 of arm 204 along track 212 of sliding mechanism 210. Rear wheel 116 may continue moving inwards (e.g., forwards towards front edge 106) by action of carrier 208 sliding along track 212 of sliding mechanism 210 until rear wheel 116 is fully stowed or collapsed inside of outer casing 102 of electric scooter 100 when electric scooter 100 is in the stowed configuration, as shown in FIG. 8.

Figure 8:
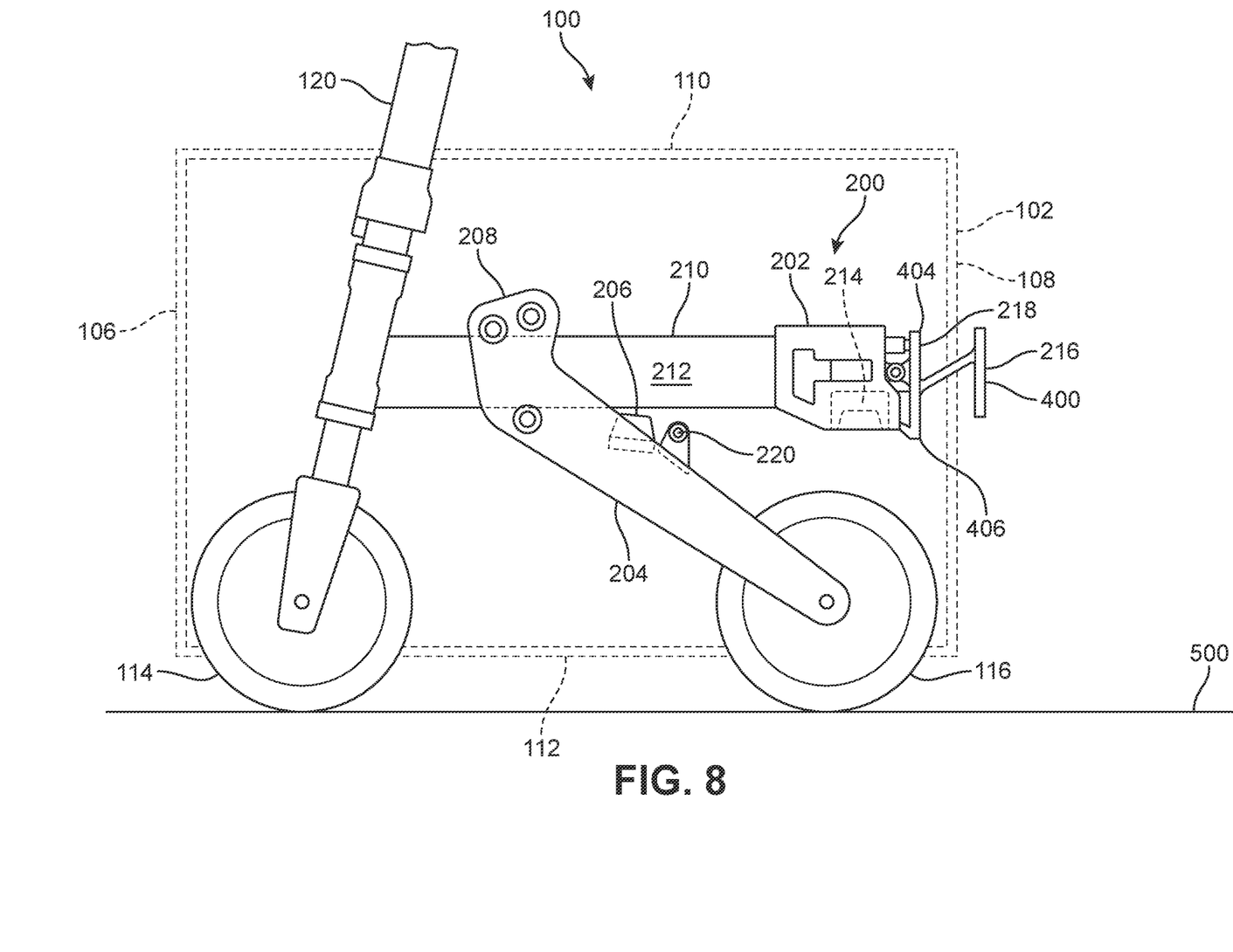
FIG. 8 is a side view of the compact personal transport device in a stowed configuration in accordance with aspects of the present disclosure.

For example, as shown in FIG. 8, with electric scooter 100 in the stowed configuration, rear wheel 116 is fully inside of outer casing 102 inward of rear edge 108 of outer casing 102. In this configuration, the compact personal transport device in the form of electric scooter 100 may be easily and conveniently carried or transported by a user.

Figure 9:
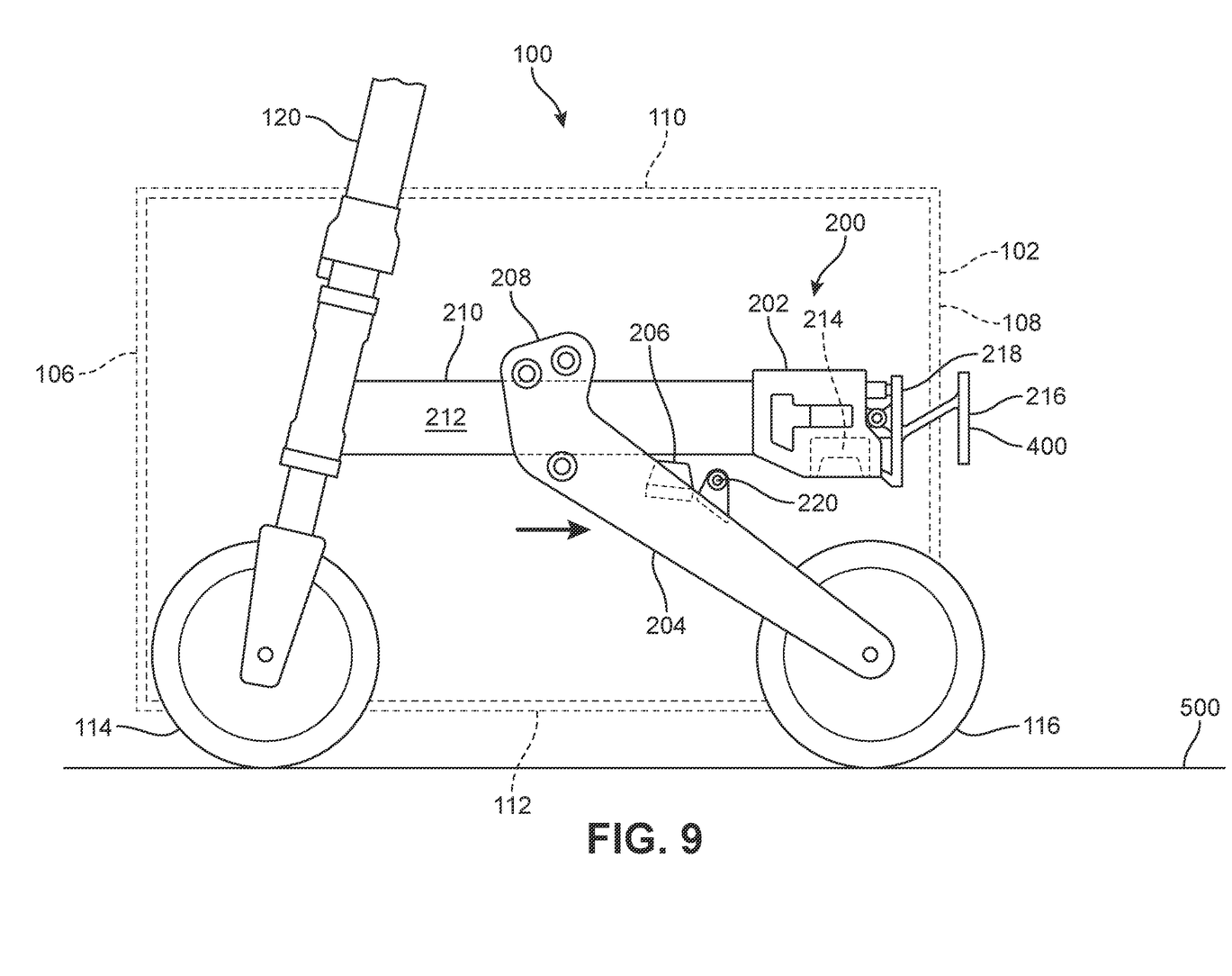
FIG. 9 is a side view of the compact personal transport device being transitioned from the stowed configuration to the riding configuration in accordance with aspects of the present disclosure.

Next, the opposite process of transitioning electric scooter 100 from the stowed configuration shown here to the riding configuration will be described with reference to FIGS. 9-12. When electric scooter 100 is ready to be ridden by a user, the user may transition electric scooter 100 from the stowed configuration shown in FIG. 8 to a riding configuration. For example, as shown in FIG. 9, rear wheel 116 is shown being extended outwards (e.g., in a rearward direction towards rear edge 108 of outer casing 102) from its initial stowed or collapsed position retracted inside of outer casing 102. For example, in some cases, a user may pull backwards on rear wheel 116 to cause carrier 208 to slide along track 212 of sliding mechanism 210. In other cases, a user may press rear wheel 116 against ground surface 500 and push electric scooter 100 forward to cause the same movement of carrier 208 along track 212 of sliding mechanism 210 so that rear wheel 116 moves rearward towards rear edge 108 of outer casing 102.

Figure 10:
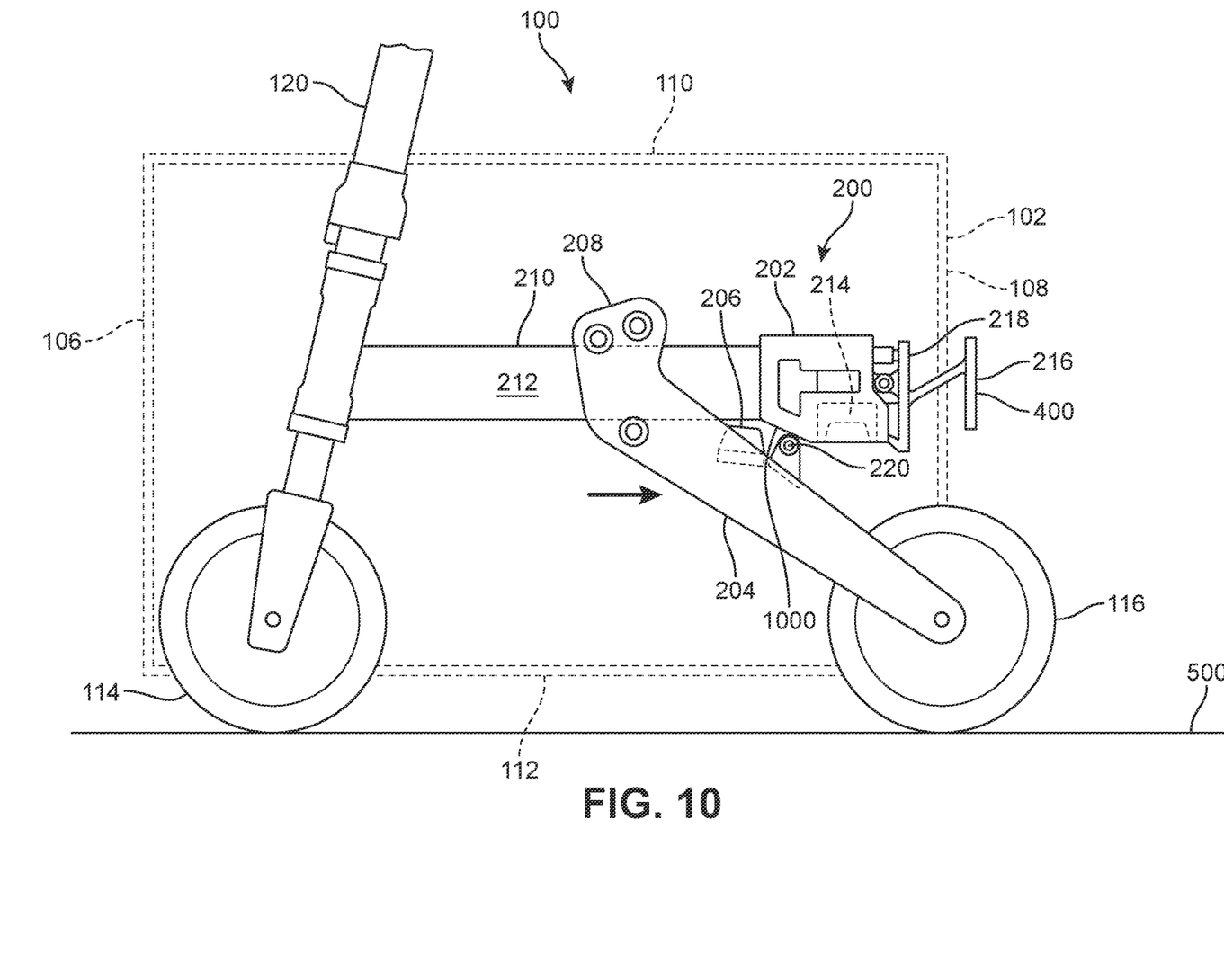
FIG. 10 is a side view of the compact personal transport device being transitioned to the riding configuration and showing a lifting member engaging a ramp in accordance with aspects of the present disclosure.

Referring now to FIG. 10, as rear wheel 116 continues to move rearwards to transition to its extended position outside of outer casing 102, knob 220 on arm 204 contacts a ramp 1000 on the underside of bracket 202. In an example embodiment, ramp 1000 on the underside of bracket 202 is located between track 212 of sliding mechanism 210 and recess 214 on the underside of bracket 202 of locking mechanism 200. With this location, ramp 1000 acts to exert a force against knob 220 on arm 204 when rear wheel 116 is sliding in the rearward direction. This force causes outer casing 102 and locking mechanism 200 to raise upwards so that protruding knuckle 206 on arm 204 does not get hung up on bracket 202 and so that protruding knuckle 206 may be positioned under recess 214 as rear wheel 116 continues to move rearward.

Figure 11:
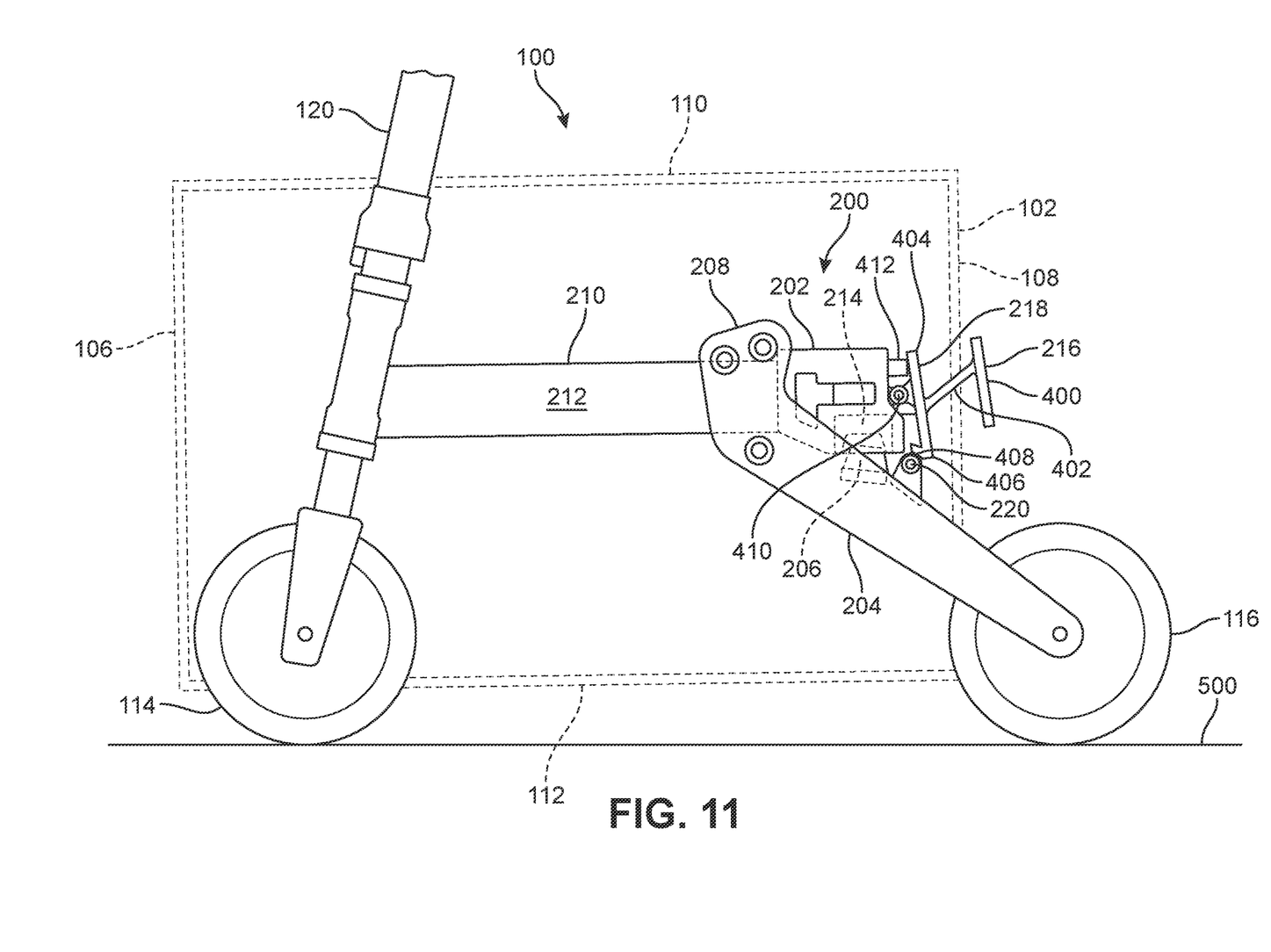
FIG. 11 is a side view of the compact personal transport device with the rear wheel locking mechanism in an open position in accordance with aspects of the present disclosure.

For example, as shown in FIG. 11, rear wheel 116 has moved to the fully extended position outside of outer casing 102 when electric scooter 100 is in the riding configuration. In this embodiment, protruding knuckle 206 is aligned and positioned directly beneath recess 214 on the underside of bracket 202. As shown in FIG. 11, knob 220 on arm 204 of rear wheel 116 is in contact with, but not yet engaged with, catch latch 408 on bottom end 406 of securing tab 218.

In some embodiments, the contact between knob 220 and catch latch 408 caused by the rearward linear movement of rear wheel 116 acts to move bottom end 406 of securing tab 218 outwards away from bracket 202 to move securing tab 218 to the open position. This movement causes securing tab 218 to pivot via pivot mechanism 410 so that top end 404 moves inwards towards bracket 202. The corresponding outward movement of bottom end 406 opens a space or gap between bracket 202 and catch latch 408 that permits knob 220 to move upwards into the gap when securing tab 218 is in the open position. In some embodiments, return cylinder 412 exerts a return force against top end 404 of securing tab 218 to push top end 404 rearwards away from bracket 202 and thereby causes bottom end 406 to move inwards towards bracket 202 via pivot mechanism 410 to move securing tab 218 to the closed position. The inward movement of bottom end 406 brings catch latch 408 into engagement with knob 220 on arm 204 when securing tab 218 is in the closed position to secure rear wheel 116 in place in the extended position outside of outer casing 102 when electric scooter 100 is in the riding configuration.

Figure 12:
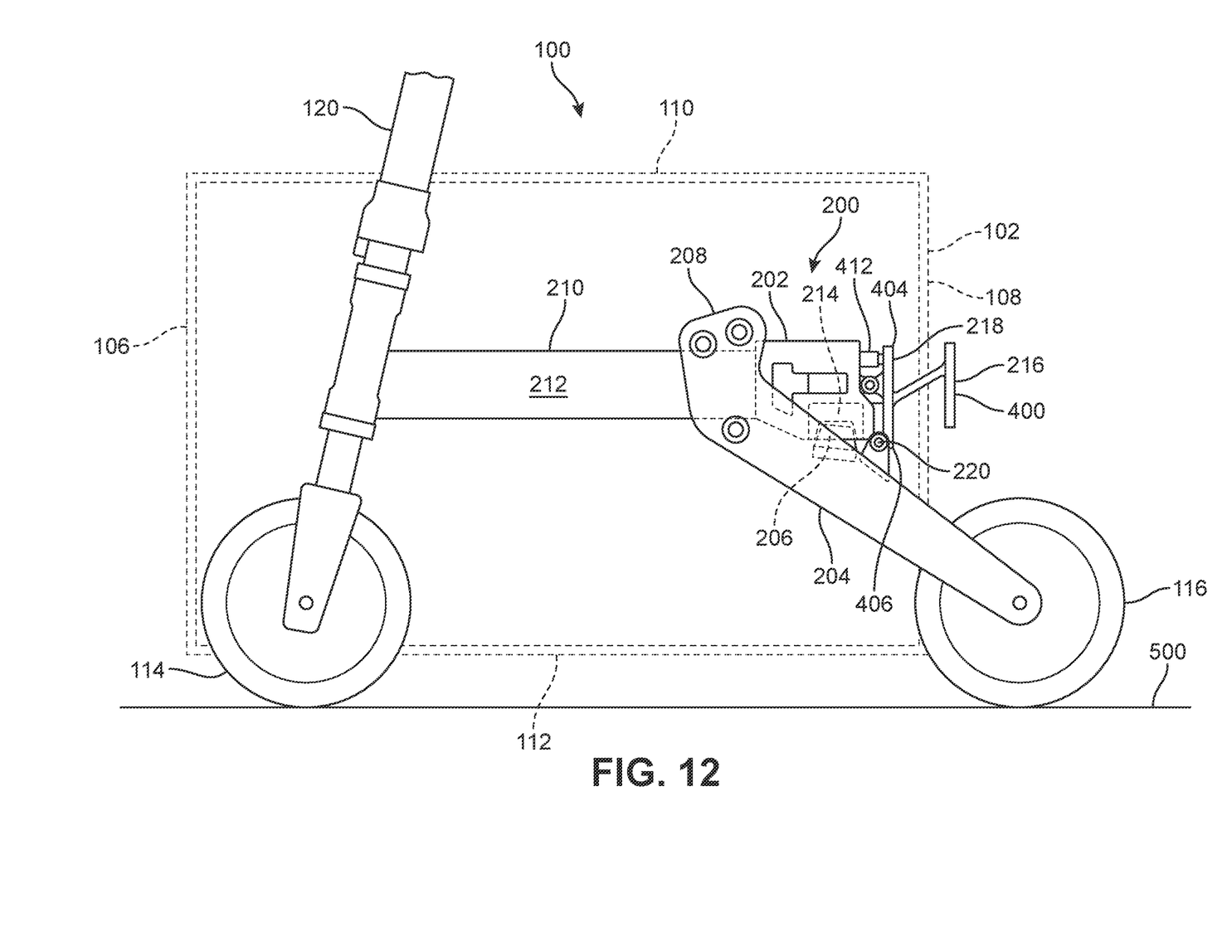
FIG. 12 is a side view of the compact personal transport device in the riding configuration with the rear wheel locking mechanism in a secured position in accordance with aspects of the present disclosure.

FIG. 12 illustrates electric scooter 100 in the riding configuration with rear wheel 116 secured in its extended position outside of outer casing 102 by locking mechanism 200 of the example embodiments. For example, as described above, in the riding configuration, locking mechanism 200 is in the secured position with protruding knuckle 206 on the top portion of arm 204 disposed within recess 214 along the underside of bracket 202 and securing tab 218 in the closed position so that catch latch 408 on bottom end 406 of securing tab 218 is engaged with knob 220 on arm 204 to further prevent movement of rear wheel 116.

By using rear wheel locking mechanism 200 of the example embodiments, electric scooter 100 may be secured in the riding configuration in a manner to prevent accidental or inadvertent linear movement of rear wheel 116. In addition, locking mechanism 200 is configured to be releasable so that rear wheel 116 may be unlocked and electric scooter 100 can be transitioned to the stowed configuration. With this arrangement, electric scooter 100 may be a convenient personal transport device for a user to travel for "last-mile" or "first-mile" trips to a destination in the riding configuration and can be quickly converted to the stowed configuration to allow the user to carry or transport once they reach their destination.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A rear wheel locking mechanism for a personal transport device comprising:
   a bracket including a recess on an underside of the bracket, the recess configured to mate with a protruding knuckle on a rear wheel arm of the personal transport device, wherein the recess has a rectangular shape;
   a securing tab attached to a back end of the bracket at a pivot mechanism;
   the securing tab comprising a top end and a bottom end opposite the top end, the pivot mechanism causing the top end and the bottom end of the release tab to move in opposite directions; and
   wherein the bottom end of the securing tab is configured to engage with a knob on a rear wheel arm of the personal transport device to secure the rear wheel arm in place to prevent linear movement.

2. The rear wheel locking mechanism according to claim 1, further comprising a catch latch located at the bottom end of the securing tab, the catch latch having an upwardly angled hook mechanism that mechanically interlocks with the knob on the rear wheel arm.

3. The rear wheel locking mechanism according to claim 1, further comprising a lifting member connected to the securing tab; and
wherein the lifting member is configured to cause the securing tab to pivot at the pivot mechanism when the lifting member is pulled in an upwards direction.

4. The rear wheel locking mechanism according to claim 3, wherein the lifting member is connected to the securing tab by an extension arm that is attached to the securing tab beneath the pivot mechanism.

5. The rear wheel locking mechanism according to claim 1, wherein the securing tab is configured to pivot via the pivot mechanism between a closed position where the top end is vertically aligned above the bottom end and an open position where the top end is closer to the bracket than the bottom end.

6. The rear wheel locking mechanism according to claim 5, further comprising a return cylinder at the back end of the bracket, wherein the return cylinder is configured to push the top end of the securing tab to return the securing tab from the open position to the closed position.

7. A rear wheel locking mechanism for a personal transport device comprising:
a sliding mechanism configured to move a rear wheel of the personal transport device between an extended position and a stowed position;
an arm connected to the rear wheel of the personal transport device at one end and connected to the sliding mechanism at an opposite end;
a protruding knuckle mounted on a top portion of the arm;
a bracket connected to a rear end of a track of the sliding mechanism, the bracket including a recess on an underside of the bracket;
a knob on the top portion of the arm, wherein the knob is located rearward of the protruding knuckle on the arm closer to the rear wheel than the protruding knuckle;
a securing tab attached to a back end of the bracket at a pivot mechanism, wherein the securing tab is configured to engage with the knob on the arm to secure the rear wheel in the extended position; and
wherein the recess is configured to mate with the protruding knuckle on the top portion of the arm to secure the rear wheel of the personal transport device in the extended position.

8. The rear wheel locking mechanism according to claim 7, the securing tab comprising a top end and a bottom end opposite the top end, the pivot mechanism causing the top end and the bottom end of the release tab to move in opposite directions; and
wherein the bottom end of the securing tab is configured to engage with the knob to prevent linear movement of the rear wheel.

9. The rear wheel locking mechanism according to claim 7, further comprising an arm support located along the top portion of the arm; and
wherein the protruding knuckle is mounted to the arm support.

10. The rear wheel locking mechanism according to claim 9, wherein the knob is located at a top of a bracket mounted to the arm support.

11. The rear wheel locking mechanism according to claim 7, further comprising a ramp on the underside of the bracket located between the rear end of the track and the recess.

12. The rear wheel locking mechanism according to claim 7, wherein the recess and the protruding knuckle have corresponding shapes.

13. The rear wheel locking mechanism according to claim 12, wherein the recess has a rectangular shape.

14. A personal transport device comprising:
an outer casing;
a front wheel;
a rear wheel;
a sliding mechanism inside the outer casing, the sliding mechanism configured to move the rear wheel between an extended position and a stowed position, wherein in the stowed position, the rear wheel is located inward of a rear edge of the outer casing and in the extended position, the rear wheel extends beyond the rear edge of the outer casing;
an arm connected to the rear wheel of the personal transport device at one end and connected to the sliding mechanism at an opposite end; and
a rear wheel locking mechanism configured to secure the rear wheel in the extended position, the rear wheel locking mechanism comprising:
a bracket including a recess on an underside of the bracket;
a protruding knuckle mounted on a top portion of the arm; and
wherein the recess is configured to mate with the protruding knuckle to secure the rear wheel in the extended position.

15. The personal transport device according to claim 14, wherein the rear wheel locking mechanism further comprises a securing tab attached to a back end of the bracket at a pivot mechanism.

16. The personal transport device according to claim 15, wherein the securing tab comprises a top end and a bottom end opposite the top end, the pivot mechanism causing the top end and the bottom end of the release tab to move in opposite directions; and
wherein the bottom end of the securing tab is configured to engage with a knob on the arm of the personal transport device to secure the rear wheel in place to prevent linear movement of the sliding mechanism.

17. The personal transport device according to claim 15, further comprising a lifting member connected to the securing tab; and
wherein the lifting member is configured to cause the securing tab to pivot at the pivot mechanism when the lifting member is pulled in an upwards direction.

18. The personal transport device according to claim 15, further comprising a return cylinder at the back end of the bracket, wherein the return cylinder is configured to push the top end of the securing tab to return the securing tab from an open position to a closed position.

19. The personal transport device according to claim 14, wherein the bracket is connected to a rear end of a track of the sliding mechanism; and
wherein the arm is connected to the track via a carrier.

* * * * *